(12) United States Patent
Mielke et al.

(10) Patent No.: US 12,208,481 B2
(45) Date of Patent: Jan. 28, 2025

(54) MULTIPLE DEGREE OF FREEDOM COMPLIANT ACTUATOR FORCE CONTROL SYSTEMS AND METHODS USED IN ROBOTIC PAINT REPAIR

(71) Applicant: 3M INNOVATIVE PROPERTIES COMPANY, St. Paul, MN (US)

(72) Inventors: Erich A. Mielke, St. Paul, MN (US); Brett R. Hemes, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 884 days.

(21) Appl. No.: 17/286,659

(22) PCT Filed: Oct. 23, 2019

(86) PCT No.: PCT/IB2019/059064
§ 371 (c)(1),
(2) Date: Apr. 19, 2021

(87) PCT Pub. No.: WO2020/084517
PCT Pub. Date: Apr. 30, 2020

(65) Prior Publication Data
US 2021/0362287 A1    Nov. 25, 2021

Related U.S. Application Data

(60) Provisional application No. 62/750,504, filed on Oct. 25, 2018.

(51) Int. Cl.
*B24B 19/26*    (2006.01)
*B24B 21/00*    (2006.01)
(Continued)

(52) U.S. Cl.
CPC ............ *B24B 19/26* (2013.01); *B24B 21/006* (2013.01); *B24B 27/0076* (2013.01);
(Continued)

(58) Field of Classification Search
CPC ... B24B 19/26; B24B 21/006; B24B 27/0076; B24B 27/04; B24B 27/0023;
(Continued)

(56) References Cited

U.S. PATENT DOCUMENTS 4,012,839 A    3/1977    Hill
5,448,146 A *  9/1995    Erlbacher ............ G05B 19/182
                                                318/568.17
(Continued)

FOREIGN PATENT DOCUMENTS

CA    2698421 A1    10/2011
CN    104259991    1/2015
(Continued)

OTHER PUBLICATIONS

Volder, "Pneumatic and hydraulic microactuators: a review," J. Micromech Microeng, 2010, vol. 20, 18 pages.
(Continued)

*Primary Examiner* — Edward F Landrum
*Assistant Examiner* — Caleb Andrew Holizna

(57) ABSTRACT

A robotic device that can include an end effector configured to manipulate one or more tools that drives one or more consumable abrasive products to abrade a substrate along several different surface dimensions, wherein the end effector comprises: three linear actuators each configured to move orthogonal relative to one another and at least one tool mount coupled to one of the three linear actuators and coupled to the tool.

9 Claims, 2 Drawing Sheets

(51) Int. Cl.
*B24B 27/00* (2006.01)
*B24B 27/04* (2006.01)
*B25J 9/16* (2006.01)
*B25J 11/00* (2006.01)

(52) U.S. Cl.
CPC .............. *B24B 27/04* (2013.01); *B25J 9/1633* (2013.01); *B25J 11/0065* (2013.01)

(58) Field of Classification Search
CPC ... B24B 19/265; B24B 41/002; B24B 41/005; B24B 49/16; B25J 9/1633; B25J 11/0065
USPC ..................................... 451/28, 65, 362, 262
See application file for complete search history.

(56) References Cited

U.S. PATENT DOCUMENTS

| | | | |
|---|---|---|---|
| 6,250,999 | B1 | 6/2001 | Pineau et al. |
| 6,461,161 | B1 | 10/2002 | Ngo et al. |
| 7,624,907 | B2 | 12/2009 | Alessi et al. |
| 8,099,188 | B2 | 1/2012 | Brogardh |
| 9,841,749 | B2 | 12/2017 | Linnell et al. |
| 10,399,178 | B2 | 9/2019 | Hemes et al. |
| 2002/0156130 | A1 | 10/2002 | Melman |
| 2006/0028041 | A1 | 2/2006 | Ono et al. |
| 2007/0099543 | A1* | 5/2007 | Belli ................. B24B 27/0076 451/41 |
| 2007/0235133 | A1 | 10/2007 | Benassi |
| 2007/0243794 | A1 | 10/2007 | Mundt |
| 2009/0186556 | A1 | 7/2009 | Hermann |
| 2013/0109277 | A1 | 5/2013 | Panergo et al. |
| 2014/0138355 | A1 | 5/2014 | Yavelberg |
| 2014/0154954 | A1 | 6/2014 | Hunt |
| 2015/0104998 | A1* | 4/2015 | Fuller .................. B24B 23/005 451/28 |
| 2016/0184962 | A1 | 6/2016 | Sjolander et al. |
| 2017/0066106 | A1 | 3/2017 | Bosio et al. |
| 2018/0158707 | A1 | 6/2018 | Hunter et al. |

FOREIGN PATENT DOCUMENTS

| | | |
|---|---|---|
| DE | 202013101858 | 7/2013 |
| DE | 102016106141 | 10/2017 |
| JP | 03234460 | 10/1991 |
| WO | WO2016/145472 | 9/2016 |
| WO | WC2018/092889 | 5/2018 |
| WO | WO2020/084411 | 4/2020 |
| WO | WO2020/084523 | 4/2020 |

OTHER PUBLICATIONS

Liu, "A flexible and highly sensitive pressure sensor based on elastic carbon foam," Journal of Material Chemistry C, 2018, vol. 6, pp. 1451-1458.
Smartfoam-Pressure, XO-NANO, 2021, [retrieved from internet on May 24, 2021], URLhttp://xonanosmartfoam.com/smartfoam-pressure/, 2 pages.
International Search report for PCT International Application No. PCT/IB2019/059064 mailed on Jan. 30, 2020, 4 pages.

* cited by examiner

MULTIPLE DEGREE OF FREEDOM COMPLIANT ACTUATOR FORCE CONTROL SYSTEMS AND METHODS USED IN ROBOTIC PAINT REPAIR

CROSS REFERENCE TO RELATED APPLICATIONS

This application is a national stage filing under 35 U.S.C. 371 of PCT/IB2019/059064 filed Oct. 23, 2019, which claims the benefit of U.S. Provisional Application No. 62/750,504, filed Oct. 25, 2018, the disclosures of which are incorporated by reference in their entireties herein.

TECHNICAL FIELD

This disclosure relates to abrading tools and consumable abrasive products, and more particularly, to robotically implemented repairs using abrading tools and consumable abrasive products.

BACKGROUND

Abrading tools and associated consumable abrasive products are used in numerous industries. For example, consumable abrasive products are used in the woodworking industries, marine industries, automotive industries, construction industries, and so on. Common abrading tools include orbital sanders, random orbital sanders, belt sanders, angle grinders, die grinders, and other tools for abrading surfaces. Consumable abrasive products can include nonwoven abrasive products, sanding disks, sanding belts, grinding wheels, burrs, wire wheels, polishing discs/belts, deburring wheels, convolute wheels, unitized wheels, flap discs, flap wheels, cut-off wheels, and other products for physically abrading workpieces. Consumable abrasive products are consumable in the sense that they can be consumed and replaced much more frequently than the abrading tools with which they are used. For instance, a grinding wheel for an angle grinder can only last for a few days of work before needing to be replaced, but the angle grinder itself can last many years.

In the automotive industry, defect-specific repairs for paint applications (e.g., primer sanding, clear coat defect removal, clear coat polishing, etc.) are accomplished using abrading tools and associated consumable abrasive products. Clear coat repair is one of the last operations to be automated in the automotive original equipment manufacturing (OEM) sector. Techniques are desired for automating this process as well as other paint applications (e.g., primer sanding, clear coat defect removal, clear coat polishing, etc.) amenable to the use of abrasives and/or robotic inspection and repair. Additionally, this problem has not been solved in the aftermarket sector (e.g. custom car modifications, DIY, detailing, and collision repair).

To date, defect-specific repairs for paint applications in the automotive industry remains a manual endeavor.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

This disclosure describes systems, methods and techniques related to various problems in automating defect-specific repairs for paint applications. For example, robotic paint repair (material removal and subsequent polishing) is not trivial to automate with the key issue being that both process actions are inherently force-dependent. That is, they require precise applied forces during processing to obtain optimal (or even sufficient) results. Robotic manipulators, due to their historical drive for ever increasing precision, are inherently stiff systems that, by themselves, cannot produce significant force control fidelity. With the addition of some advanced force sensing and reactive control loops/algorithms it is possible to have the robot manipulators apply controlled forces to the workpiece but the systems in general still suffer from high stiffness (i.e., small positional displacements result in large changes of joint torques and thus large forces at the end effector). As a solution to the above, the current state-of-the art consists of attaching softer redundant actuation between the robot and the tool. This added compliance reduces force-displacement curves and results in systems that can precisely control applied forces over a particular displacement.

Traditional robotic systems in the abrasives field either utilize single axis force apparatuses with control loops where pneumatic pressure or current is used to provide compliance or utilize cylindrical pressure or current operated apparatuses with control loops that require calibration but are premised on monitoring the cylindrical pressure or current. With this in mind, the present inventors have recognized herein systems, methods and techniques that represent improvements on the current state of the art. For example, these systems, methods and techniques can provide multiple degrees of freedom such as in six axes. According to one example, the present inventors have developed a six axis force/torque system with pneumatic based control. This arrangement is more flexible for variety of tool/sensor configurations, can use off-axis measurements for internal frictional compensation, and can provide for torque-driven force control (pressure=f(on-axis torque)).

The present inventors further recognize that in many scenarios, it may be desirable for a robot to apply a desired force in multiple directions during the same motion. Having an end-effector that allows for multi degree-of-freedom (DOF) control reduces tool switching and orientation change during a task. It also reduces the number of passes needed to complete a multi-dimensional task. The force can be controlled in a feedback loop, where the desired force is input and achieved force is the feedback term.

Thus, according to one example, in situations where a random-orbital tool, or other rotating tool, is attached to the robot via an end effector (referred to herein as a tool stack in some cases), it becomes possible to process multiple surfaces simultaneously. The robot via the end effector can also process tight corners while monitoring the forces applied to orthogonal surfaces to avoid damaging the substrate or tool. Additionally, processing the intersection of two or more orthogonal surfaces becomes feasible, as the forces being applied to multiple surfaces can be monitored and incorporated into the control loop.

According to one example, the end effector discloses herein involves three linear pneumatic or electro-mechanical actuators incorporated into one device. The actuators can move orthogonally to one another to achieve three DOF force control. Each actuator can provide compliance in its respective direction, and a user can remove, or disable, one or more of the actuators to provide lower DOF force control as needed.

The present disclosure generally contemplates are two design types for this end effector device: one with multiple mounting points and another with a single mounting point. The multiple mount design can allow for multiple abrading tools to be used in the same process, and the single mount design can allow for a single tool to be used but in multiple DOF.

The details of one or more examples of the disclosure are set forth in the accompanying drawings and the description below. Other features, objects, and advantages of the disclosure will be apparent from the description, drawings, and claims.

The disclosure herein includes but is not limited to the following illustrative Examples:

Example 1 is a robotic device that can optionally comprise: an end effector configured to manipulate one or more tools that drives one or more consumable abrasive products to abrade a substrate along several different surface dimensions, wherein the end effector comprises: three linear actuators each configured to move orthogonal relative to one another and at least one tool mount coupled to one of the three linear actuators and coupled to the tool.

Example 2 is the robotic device of Example 1, wherein the at least one tool mount can comprise three tool mounts each coupled to a respective one of the three linear actuators, wherein the one or more tools comprise three tools each coupled to a respective one of the tool mounts, wherein the one or more consumable abrasive products comprise three abrasive products each coupled to a respective one of the tools, and wherein the robotic device is configured to abrade the substrate in multiple dimensions simultaneously.

Example 3 is the robotic device of any one or combination of Examples 1-2, optionally further comprising force control sensors and devices coupled to each of the three linear actuators.

Example 4 is the robotic device of any one or combination of Examples 1-3, wherein the linear actuators comprise one or a combination of pneumatic and electro-mechanical actuators.

Example 5 is a robotic paint repair system that can optionally comprise: three consumable abrasive products each configured to abrade a substrate, three tools each configured to drive a respective one of the three consumable abrasive products, a robotically controlled end effector configured to manipulate the three tools and three consumable abrasive products to abrade the substrate in multiple directions simultaneously, wherein the end effector comprises: three linear actuators each configured to move orthogonal relative to one another and three tool mounts each coupled to a respective one of the three linear actuators and coupled to a respective one of the three tools.

Example 6 is the robotic paint repair system of Example 5, optionally further comprising force control sensors and devices coupled to each of the three linear actuators.

Example 7 is the robotic paint repair system any one or combination of Examples 5-6, wherein the three linear actuators comprise one or a combination of pneumatic and electro-mechanical actuators.

Example 8 is a method of removing paint on a substrate that can optionally comprise: providing a robotically controllable end effector having three linear actuators and at least one of the three linear actuators coupled with at least one tool mount, coupling at least one tool stack including a consumable abrasive product and tool to the at least one tool mount, actuating each of the three linear actuators independently to move orthogonally relative to one another thereby positioning the tool stack within a three-dimensional space as desired, wherein the positioning of the tool stack orients the consumable abrasive product as desired within the three-dimensional space, and abrading a surface the substrate along one or more dimensions thereof with the consumable abrasive product oriented as desired.

Example 9 is the method of repairing paint of Example 8, wherein actuating can orient the consumable abrasive product to correspond in orientation to an orientation of the surface of the substrate in the three dimensions, and wherein abrading the surface of the substrate is along three dimensions thereof.

Example 10 is the method of repairing paint of any one or combination of Examples 8-9, further comprising abrading multiple separate portions of the surface of the substrate simultaneously using three separate tool stacks, wherein the three separate tool stacks comprise the at least one tool stack.

Example 11 is a method of repairing paint on a substrate that can optionally comprise: providing a robotically controllable end effector having three linear actuators each coupled with a respective tool mount, coupling three respective tool stacks each including a consumable abrasive product and tool to each respective tool mount, actuating each of the three linear actuators independently to move orthogonally relative to one another thereby positioning each of the three tool stacks separately of one another within a three-dimensional space as desired, wherein the positioning each of the three tool stacks orients each consumable abrasive product as desired within the three-dimensional space, and abrading multiple separate portions of a surface of the substrate simultaneously using each of the three tool stacks with each consumable abrasive product oriented as desired.

DETAILED DESCRIPTION

Figure 1:
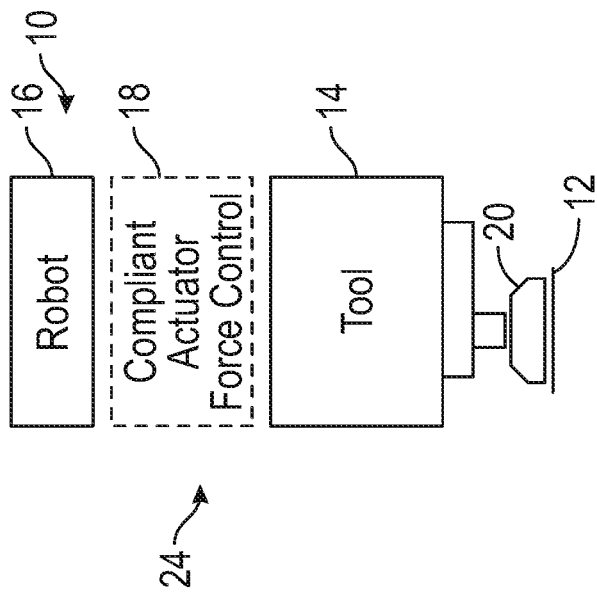
FIG. 1 is a schematic diagram illustrating an example system for robotic paint repair using a compliant actuator force control end effector in accordance with one example of the present application.

Abrading tools and associated consumable abrasive products present various challenges for individuals and organizations. In one example, over time workers frequently develop an intuitive sense of when a workpiece is of desired quality or when a consumable abrasive product is wearing out. However, a robot using an abrading tool may not acquire such an intuitive sense. Various techniques, systems and methods are disclosed herein to more accurately control robot manipulation of the abrading tool to achieve more desirable results (i.e., more accurate and desirable abrading of substrate to remove paint in one example). Other techniques disclosed herein add process efficiencies by allowing for abrading of a substrate in multiple directions and/or with multiple consumable abrasive products simultaneously.

It should be understood that although an illustrative implementation of one or more embodiments are provided below, the disclosed systems and/or methods described with respect to FIGS. 1-4 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

According to one aspect of this disclosure, a system is disclosed that includes an end effector configured to manipulate one or more tools that drives one or more consumable abrasive products to abrade a substrate along several different surface dimensions. The end effector can comprise three linear actuators each configured to move orthogonal relative to one another, and at least one tool mount coupled to one of the three linear actuators and coupled to the one or more tools. According to one example as described herein, data gathered regarding the end effector (e.g., force, torque, pressure, etc.) can be utilized for control of the robotic device and automating the process of repairing defects for paint applications using automated abrasive processing and subsequent polishing. The disclosed techniques, systems and methods can include novel combinations of robotic methodology, end effector design, tools, sensing techniques, stochastic process policy that results in desired system behavior based on current part/system state and provided feedback, and an optional learning component capable of optimizing provided process policy, continuously adapting the policy due to customer's upstream process variations, and/or learning the process policy from scratch with little-to-no human intervention. Although described in reference to repairing defects for paint applications the techniques, methods and systems disclosed can be utilized in other abrading applications.

According to one aspect of the present application, a system includes a computing system that is configured to: receive data from a communication unit regarding a property that is measured indicative of at least one operating parameter of the end effector. The system can use the data for control/feedback to guide manipulation of the end effector by the robot and can use the data for control/feedback to the end effector itself to added compliance that smooths out the force-displacement curves and results in systems that can precisely control applied forces over a particular displacement.

FIG. 1 is a highly schematic diagram of a system 10 that can be used for robotic paint repair. The system 10 can include a consumable abrasive product 12, an abrading tool 14, a robotic device 16, a force-controlled compliant actuator 18 and a backup pad 20. As used herein the consumable abrasive product 12, the abrading tool 14, the force-controlled compliant actuator 18, the backup pad 20 and other components further illustrated in FIGS. 3 and 4 can comprise an end effector 24. The end effector 24 is more or less synonymous with the term tool stack; thus, in this document the term "stack" is the end effector in the context of robotic paint repair. Also, though described for providing robotic paint repair, which includes repair of primer, paint, and clear coats, it will be appreciated that the techniques described herein lend themselves to other industrial applications beyond paint repair.

The consumable abrasive product 12 can be configured to abrade a substrate (not shown). As discussed, in one application of the system 10 can be for defect-specific repairs for paint applications (e.g., primer sanding, clear coat defect removal, clear coat polishing, etc.). Thus, the consumable abrasive product 12 can be configured for this sanding and buffing applications. The tool 14 can be coupled to and configured to drive the consumable abrasive product 12 to abrade the substrate. The robotic device 16 can be coupled to and configured to manipulate the tool 14. Thus, the robotic device 16 can move the tool 14 within a three dimensional spaced via the force-controlled compliant actuator 18 as desired while the tool 14 is operable to drive the consumable abrasive product 12 to abrade. The force-controlled compliant actuator 18 can be mechanically, pneumatically, and/or electrically coupled to other components of the end effector 24 such as the tool 14 and can be a part thereof. In the example of FIG. 1, the force-controlled compliant actuator 18 can be coupled to the tool 14 at one end and to the robotic device 16 at another end.

Figure 3:
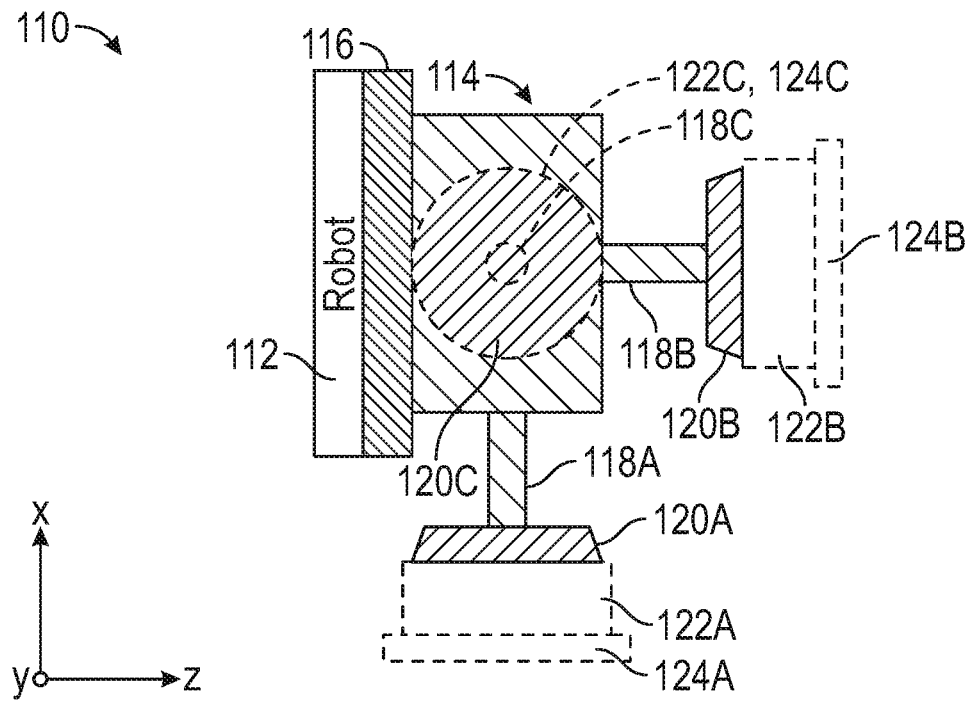
FIG. 3 is a schematic diagram illustrating the end effector having three linear pneumatic or electro-mechanical actuators and three tool mounting points in accordance with one example of the present application.
Figure 4:
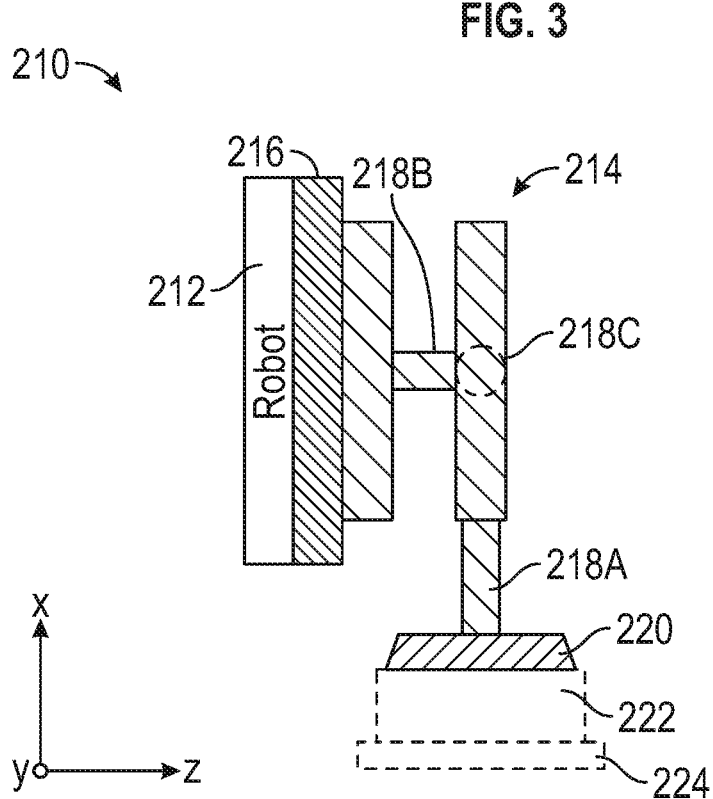
FIG. 4 is a schematic diagram illustrating the end effector having three linear pneumatic or electro-mechanical actuators and a single tool mounting point in accordance with one example of the present application.

Examples of the force-controlled compliant actuator 18 are provided in FIGS. 3 and 4, and can be physical component and sensory component of the end effector 24. The force-controlled compliant actuator 18 can be configured to measure an implementation force via sensors in various components of the end effector 24 such as the backup pad 20, the consumable abrasive product 12, the tool 14, for example. Sensors can also be utilized to measure implementation force on the substrate (now shown) in some examples. The force-controlled compliant actuator 18 can further measure other implementation force such as that of the robotic device 16 and can be configured to control manipulation of the robotic device and/or other operational criteria of the end effector 24 based upon the implementation force. This can result in an altered stiffness for the end effector 24 due to changes in the force/pressure applied to components thereof (most notably the consumable abrasive product 12) due to the force-controlled compliant actuator 18. The force-controlled compliant actuator 18 can further include various types of feedback including force and/or torque sensing. The force-controlled compliant actuator 18 can also implement low friction technology, such as, but not limited to, air-slides and gearless electrical linear units. The force-controlled compliant actuator 18 also can be actuated pneumatically or electro-mechanically.

The backup pad 20 can be positioned between the consumable abrasive product and the tool 14, for example. The backup pad 20 can be coupled with the consumable abrasive product 12. According to one example, the backup pad 20 can have outer layer(s) with natural rubber or synthetic rubber (for example, urethane rubber or chloroprene rubber) as a main raw material. The backup pad 20 can have an inner layer that can be, for example, a foam body obtained from natural rubber or synthetic rubber. The foam body can be a closed cell foam or an open cell foam. Alternatively, the material of the inner layer may be natural rubber or synthetic rubber.

Figure 2:
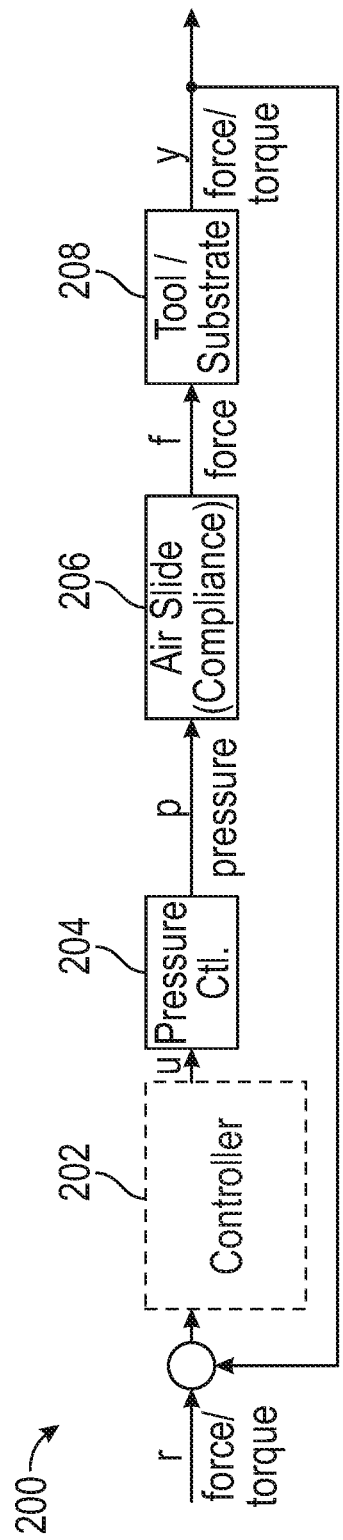
FIG. 2 is a schematic diagram of a control loop for compliant force control of the system of FIG. 1, in accordance with one example of the present application.

As briefly discussed above and now shown specifically with respect to FIG. 2, the force-controlled compliant actuator 18 can rely on sensed torque of the tool 14, the backup pad 20, the substrate or other component of FIG. 1 as input for a feedback loop shown. The input can be used to actuate the force-controlled compliant actuator 18 to control implementation force. For example, if the force-controlled compliant actuator 18 can utilize the input torque and can be actuated (using pneumatics, servo electric etc.) to alter force from the robotic device 16 so as to apply a desired force and desired stiffness to the consumable abrasive product 12. In this manner, undesired amounts of force/pressure etc. such as the implementation force of the robotic device 16 (if to high) that can result from undesirable manipulation of the robotic device 16 can be avoided from transfer to the consumable abrasive product 12 (and hence the substrate) by use of the force-controlled compliant actuator 18.

This process is illustrated in the control system 200 of FIG. 2, where sensed torque is used and input from a feedback loop to a controller 202. This controller 202 can communicate electronically with a pressure controller 204 (part of the force-controlled compliant actuator 18 for example). The pressure controller 204 can control a pressure and force applied to the tool stack 208 via an air slide 206 or another type of compliance device that is known in the art, including, but not limited to, mass-spring-damper systems, gearless-electric linear units, air springs, and pneumatic bellows. The torque or force of the tool stack 208 (such as from the backup pad, the tool, the CAP, the substrate as previously described) can be continuously measured and used as a feedback for the control system 200. If torque or another monitored value changes, the control system 200 via the controller 202 can change pressure, force and other operational criteria in response.

The desired force can comprise a range, a target, a maximum value, a minimum value, for example. The desired stiffness can comprise one or more of an angular stiffness and a lateral stiffness, for example.

In the manual clear-coat repair process, at a high-level, is well known and accepted in the industry. It is a two-step process: abrasion/sanding and polishing/buffing. From an automation perspective, the following inputs and outputs may be of relevance in different embodiments (with examples from the 3M Finesse-it system):

Inputs:
    Shared (sanding and polishing)
        Tool speed [frequency]
        Tool orbit [length]
        Randomness (i.e., random orbital vs. orbital)
        Path pattern
        Path speed [velocity]
        Applied force/pressure
        Angle (i.e., off normal)
        Total process time
    Sanding-specific
        Backup pad
            Hardness
        Abrasive Type (e.g., disc)
            Format
                e.g., {disc, belt, file belt, etc.}
            Type
                e.g., {coated, bonded, nonwoven, Trizact, etc.}
            Product
                e.g., {468LA, 366LA, 464LA, 466LA}
            Grade
                e.g., {A3, A5, A7, P600, P800, 3000, etc.}
            Diameter/Scallop
                e.g., {1¼", 1⅜" scalloped}
            State
                Age (e.g., age ≈ f (pressure, time))
                Cleanliness (e.g., has the disc been cleaned?)
    Polishing-specific
        Buffing pad
            Foam type, density, etc.
                e.g., {Gray, Orange, Red, Green, White}
            Diameter
                e.g., {3¼", 3¾", 5¼"}
            Surface profile
                e.g., {flat, egg crate, wool, etc.}
        Polish
            Amount
            Distribution
            Finish
                e.g., {FM, P, EF, K211, FF, UF}
Outputs:
    Uniformity
    Roughness
    Gloss percentage
    Time to buff
    Final buff quality (e.g., uniformity, haze, etc.)

FIG. 3 is a schematic depiction of a device 110 that can be used as part of the system of FIG. 1 for robotic paint repair. The device 110 can include a robotic device 112 and a portion of an end effector 114. The portion of the end effector 114 shown in FIG. 3 includes sensor(s) 116. The portion of the end effector 114 shown in FIG. 3 further comprises three linear actuators 118A, 118B and 118C each configured to move orthogonal relative to one another and three tool mounts 120A, 120B and 120C. Further components of the end effector 114 such as the abrading tools 122A, 122B, 122C and CAPs 124A, 124B and 124B are shown in a highly schematic manner in phantom. It should be recognized that other portions of the end effector 114 such as those previously shown in FIG. 1 are not specifically shown in FIG. 3.

In the example of FIG. 3, the linear actuators 118A, 118B and 118C can be pneumatic actuators, electric servo motor powered actuators, or combinations thereof. The three linear actuators 118A, 118B and 118C are each configured (oriented) to move orthogonal relative to one another. Each tool mount 120A, 120B and 120C can couple with/be connected to a corresponding one of the three linear actuators 118A, 118B and 118C. Thus, the tool mount 120A can couple with the linear actuator 118A. The tool mount 120B can couple with the linear actuator 118B. The tool mount 120C can couple with the linear actuator 118C.

Thus, with the example of FIG. 3, the three tool mounts 120A, 120B and 120C are each coupled to a respective one of the three linear actuators 118A, 118B and 118C. The three tools 122A, 122B and 122C are each coupled to a respective one of the tool mounts 120A, 120B and 120C. The three abrasive products 124A, 124B and 124C are each coupled to a respective one of the tools 122A, 122B and 122C. The robotic device 112 is configured to abrade the substrate in multiple dimensions simultaneously and in multiple locations simultaneously using the end effector 114. In particular, the three consumable abrasive products 124A, 124B and 124C can each be configured to abrade a substrate at a different portion thereof. The three tools 122A, 122B and 122C can each be configured to drive a respective one of the three consumable abrasive products 124A, 124B and 124C. Additionally, multiple tools 122A, 122B and 122C can be different tools, each used to abrade the same substrate in the same location, minimizing tool change time. The sensor(s) 116 can comprise force control sensors coupled to each of the three linear actuators 118A, 118B and 118C.

FIG. 4 is a schematic depiction of a device 210 that can be used as part of the system of FIG. 1 for robotic paint repair. The device 210 can include a robotic device 212 and a portion of an end effector 214. The portion of the end effector 214 shown in FIG. 4 includes sensor(s) 216. The portion of the end effector 114 shown in FIG. 3 further comprises three linear actuators 218A, 218B and 218C each configured to move orthogonal relative to one another and a single tool mount 220. Further components of the end effector 214 such as an abrading tool 222 and CAP 124 are shown in a highly schematic manner in phantom. It should be recognized that other portions of the end effector 214 such as those previously shown in FIG. 1 are not specifically shown in FIG. 4.

In the example of FIG. 4, the linear actuators 218A, 218B and 218C can be pneumatic actuators, electric servo motor powered actuators, or combinations thereof. The three linear actuators 218A, 218B and 218C are each configured (oriented) to move orthogonal relative to one another. The single tool mount 220 can couple with/be connected to only one of the three linear actuators 218A, 218B and 218C. In the illustrated example, the tool mount 220 is coupled to the linear actuator 218A. However, because of the interconnected arrangement of the three linear actuators 218A, 218B and 218C with the end effector 214 design, the tool mount 220 is moveable by linear movement of the three linear actuators 218A, 218B and 218C in three dimensions (indicated with Cartesian coordinate system of FIG. 4). As with the example of FIG. 3, the example of FIG. 4 can thus be moveable in three dimensions. Thus, as the substrate has a three dimensional surface and the end effector 114, 214 can be manipulatable in three dimensions as well. These three dimensions for the manipulation (resulting from three independent linear movements) can be oriented to correspond to those of the surface of the substrate so that one can achieve abrading of the surface along the three dimensions. Thus, the end effector 114, 214 can be configured to manipulate one or more tools that drive one or more consumable abrasive products to abrade the substrate along several different surface dimensions.

Thus, according to one method that can be implemented using the devices 110, 210 for example, a robotically controllable end effector is provided having three linear actuators and at least one of the three linear actuators coupled with at least one tool mount. The method can couple at least one tool stack including a consumable abrasive product and tool to the at least one tool mount. Each of the three linear actuators can be actuated independently to move orthogonally relative to one another thereby positioning the tool stack within a three-dimensional space as desired, wherein the positioning of the tool stack orients the consumable abrasive product as desired within the three-dimensional space. A surface the substrate can be abraded along one or more dimensions thereof with the consumable abrasive product oriented as desired. With the method, actuating can orient the consumable abrasive product to correspond in orientation to an orientation of the surface of the substrate in the three dimensions, and wherein abrading the surface of the substrate is along three dimensions thereof. With the method, abrading multiple separate portions of the surface of the substrate can be done simultaneously using three separate tool stacks, where the three separate tool stacks comprise the at least one tool stack.

According to a further method more specific to the example of FIG. 3, a robotically controllable end effector can be provided having three linear actuators each coupled with a respective tool mount. The method can couple three respective tool stacks each including a consumable abrasive product and tool to each respective tool mount. The method can actuate each of the three linear actuators independently to move orthogonally relative to one another thereby positioning each of the three tool stacks separately of one another within a three-dimensional space as desired, where the positioning each of the three tool stacks orients each consumable abrasive product as desired within the three-dimensional space. Additionally, the method can abrade multiple separate portions of a surface of the substrate simultaneously using each of the three tool stacks with each consumable abrasive product oriented as desired.

It is to be recognized that depending on the example, certain acts or events of any of the techniques described herein can be performed in a different sequence, can be added, merged, or left out altogether (e.g., not all described acts or events are necessary for the practice of the techniques). Moreover, in certain examples, acts or events can be performed concurrently, e.g., through multi-threaded processing, interrupt processing, or multiple processors, rather than sequentially.

In one or more examples, the functions described can be implemented in hardware, software, firmware, or any combination thereof, located locally or remotely. If implemented in software, the functions can be stored on or transmitted over a computer-readable medium as one or more instructions or code and executed by a hardware-based processing unit. Computer-readable media can include computer-readable storage media, which corresponds to a tangible medium such as data storage media, or communication media including any medium that facilitates transfer of a computer program from one place to another, e.g., according to a communication protocol. In this manner, computer-readable media generally can correspond to (1) tangible computer-readable storage media which is non-transitory or (2) a communication medium such as a signal or carrier wave. Data storage media can be any available media that can be accessed by one or more computers or one or more processors to retrieve instructions, code and/or data structures for implementation of the techniques described in this disclosure. A computer program product can include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions can be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein can refer to any of the foregoing structures or any other structure suitable for implementation of the techniques described herein. In addition, in some aspects, the functionality described herein can be provided within dedicated hardware and/or software modules. Also, the techniques could be fully implemented in one or more circuits or logic elements.

The techniques of this disclosure can be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units can be combined in a hardware unit or provided by a collection of interoperative hardware units, including one or more processors as described above, in conjunction with suitable software and/or firmware.

The functions, techniques or algorithms described herein may be implemented in software in one example. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the examples described are merely examples. The software may be executed on a digital signal processor, ASIC, microprocessor, or other type of processor operating on a computer system, such as a personal computer, server or other computer system, turning such computer system into a specifically programmed machine Various examples have been described. These and other examples are within the scope of the following claims.

What is claimed is:

1. A robotic device, comprising:
   an end effector configured to manipulate one or more tools that drives one or more consumable abrasive products to abrade a substrate along several different surface dimensions, wherein the end effector comprises:
   three linear actuators each configured to move orthogonal relative to one another; and
   at least one tool mount coupled to one of the three linear actuators and coupled to the tool,
   wherein the at least one tool mount comprises three tool mounts each coupled to a respective one of the three linear actuators, wherein the one or more tools comprise three tools each coupled to a respective one of the tool mounts, wherein the one or more consumable abrasive products comprise three abrasive products each coupled to a respective one of the tools, and wherein the robotic device is configured to abrade the substrate in multiple dimensions simultaneously.

2. The robotic device of claim 1, further comprising force control sensors coupled to each of the three linear actuators.

3. The robotic device of claim 1, wherein the linear actuators comprise one or a combination of pneumatic and electro-mechanical actuators.

4. A robotic paint repair system, comprising:
   three consumable abrasive products each configured to abrade a substrate;
   three tools each configured to drive a respective one of the three consumable abrasive products;
   a robotically controlled end effector configured to manipulate the three tools and three consumable abrasive products to abrade the substrate in multiple directions simultaneously, wherein the end effector comprises:
   three linear actuators each configured to move orthogonal relative to one another; and
   three tool mounts each coupled to a respective one of the three linear actuators and coupled to a respective one of the three tools.

5. The robotic paint repair system of claim 4, further comprising force control sensors coupled to each of the three linear actuators.

6. The robotic paint repair system of claim 4, wherein the three linear actuators comprise one or a combination of pneumatic and electro-mechanical actuators.

7. A method of removing paint on a substrate, comprising:
   providing a robotically controllable end effector having three linear actuators and at least one of the three linear actuators coupled with at least one tool mount;
   coupling at least one tool stack including a consumable abrasive product and tool to the at least one tool mount;
   actuating each of the three linear actuators independently to move orthogonally relative to one another thereby positioning the tool stack within a three-dimensional space as desired, wherein the positioning of the tool stack orients the consumable abrasive product as desired within the three-dimensional space; and
   abrading multiple separate portions of a surface of the substrate simultaneously using three separate tool stacks with the consumable abrasive product oriented as desired, wherein the three separate tool stacks comprise the at least one tool stack.

8. The method of repairing paint of claim 7, wherein actuating orients the consumable abrasive product to correspond in orientation to an orientation of the surface of the substrate in the three dimensions, and wherein abrading the surface of the substrate is along three dimensions thereof.

9. A method of repairing paint on a substrate, comprising:
   providing a robotically controllable end effector having three linear actuators each coupled with a respective tool mount;
   coupling three respective tool stacks each including a consumable abrasive product and tool to each respective tool mount;
   actuating each of the three linear actuators independently to move orthogonally relative to one another thereby positioning each of the three tool stacks separately of one another within a three-dimensional space as desired, wherein the positioning each of the three tool stacks orients each consumable abrasive product as desired within the three-dimensional space; and
   abrading multiple separate portions of a surface of the substrate simultaneously using each of the three tool stacks with each consumable abrasive product oriented as desired.

* * * * *